United States Patent
Nayak (10) Patent No.: US 10,014,730 B2
(45) Date of Patent: Jul. 3, 2018

(54) RADIO FREQUENCY HARVESTER ASSEMBLY

(71) Applicant: UTC FIRE AND SECURITY AMERICAS CORPORATION, INC., Bradenton, FL (US)

(72) Inventor: Jagannath Nayak, Aska (IN)

(73) Assignee: UTC FIRE & SECURITY AMERICAS CORPORATION, INC., Bradenton, FL (US)

(*) Notice: Subject to any disclaimer, the term of this patent is extended or adjusted under 35 U.S.C. 154(b) by 133 days.

(21) Appl. No.: 14/903,322

(22) PCT Filed: Jul. 7, 2014

(86) PCT No.: PCT/US2014/045572
§ 371 (c)(1),
(2) Date: Jan. 7, 2016

(87) PCT Pub. No.: WO2015/006214
PCT Pub. Date: Jan. 15, 2015

(65) Prior Publication Data
US 2016/0149441 A1    May 26, 2016

Related U.S. Application Data

(60) Provisional application No. 61/843,667, filed on Jul. 8, 2013.

(51) Int. Cl.
*H02J 50/27* (2016.01)
*H01Q 1/24* (2006.01)
(Continued)

(52) U.S. Cl.
CPC ............ *H02J 50/27* (2016.02); *H01Q 1/248* (2013.01); *H01Q 1/36* (2013.01); *H01Q 1/38* (2013.01);
(Continued)

(58) Field of Classification Search
CPC .......... H02J 50/27; H01Q 1/38; H01Q 21/06; H01Q 1/36; H01Q 1/248; H01Q 21/24; H01Q 21/061; H01Q 21/08; H01Q 21/065
See application file for complete search history.

(56) References Cited

U.S. PATENT DOCUMENTS 3,956,752 A    5/1976    Phelan et al.
4,087,821 A *  5/1978    Phelan ..................... H01Q 3/46
                                                        260/1
(Continued)

FOREIGN PATENT DOCUMENTS

KR    20090011509 A    2/2009
WO    2012042348 A2    4/2012

OTHER PUBLICATIONS

Buonanno, Aniello, et al., "An ultra wide-band system for RF Energy harvesting", Antennas and Propagation (EUCAP), Proceedings of the 5th European Conference on, IEEE, Apr. 11, 2011, pp. 388-389.

(Continued)

*Primary Examiner* — Jung Kim
(74) *Attorney, Agent, or Firm* — Cantor Colburn LLP (57) ABSTRACT

A device for harvesting radio frequency (RF) energy to generate power includes a first spiral antenna having a first spiral direction, the first spiral antenna having a spiral cross-section shape along a first flat plane. The device includes a second spiral antenna having a second spiral direction opposite the first spiral direction, the second spiral antenna having a spiral cross-section shape along a second plane parallel to the first plane. The device further includes a ground layer between the first and second spiral antennae, the first spiral antenna electrically connected to the second spiral antenna at a center of the first and second spiral (Continued)

antennae by a conductive element passing through the ground layer without contacting the ground layer.

8 Claims, 9 Drawing Sheets

(51) Int. Cl.
    *H01Q 1/36*     (2006.01)
    *H01Q 1/38*     (2006.01)
    *H01Q 21/06*     (2006.01)
    *H01Q 21/24*     (2006.01)

(52) U.S. Cl.
    CPC ........... *H01Q 21/06* (2013.01); *H01Q 21/061* (2013.01); *H01Q 21/24* (2013.01)

(56) References Cited

U.S. PATENT DOCUMENTS

| | | |
|---|---|---|
| 4,943,811 A | 7/1990 | Alden et al. |
| 5,045,862 A | 9/1991 | Alden et al. |
| 5,321,414 A | 6/1994 | Alden et al. |
| 5,563,614 A | 10/1996 | Alden et al. |
| 5,907,305 A | 5/1999 | Epp et al. |
| 6,369,759 B1 | 4/2002 | Epp et al. |
| 6,882,128 B1 | 4/2005 | Rahmel et al. |
| 8,115,683 B1 | 2/2012 | Stefanakos et al. |
| 8,228,194 B2 | 7/2012 | Mickle et al. |
| 8,330,298 B2 | 12/2012 | Scherbenski et al. |
| 8,362,745 B2 | 1/2013 | Tinaphong |
| 2007/0298846 A1 | 12/2007 | Greene et al. |
| 2009/0117872 A1 | 5/2009 | Jorgenson et al. |
| 2017/0069952 A1* | 3/2017 | Tunnell .............. G06Q 20/3278 |

OTHER PUBLICATIONS

Hagerty, Joseph A., et al., "Broadband Rectenna Arrays for Randomly Polarized Incident Waves", European Microwave Conference, 2000. 30th, IEEE, Piscataway, NJ, USA, Oct. 2000 (Oct. 2000), pp. 1-4, XP031067475.

International Search Report for application PCT/US2014/045572, Oct. 31, 2014, 5 pages.

Laskovski, Anthony Nikola, et al., "Stacked Spirals for Biosensor Telemetry", IEEE Sensors Journal, IEEE Service Center, New York, NY, US, vol. 11, No. 6, Nov. 11, 2006 pp. 1484-1490.

Written Opinion for application PCT/US2014/045572, Oct. 31, 2014, 5 pages.

* cited by examiner

ABSTRACT

RADIO FREQUENCY HARVESTER ASSEMBLY

BACKGROUND OF THE INVENTION

Embodiments of the invention relate to radio frequency harvesters, and in particular to spiral antennae for harvesting RF signals to generate power.

Numerous methods are being developed and used to harvest non-conventional or ambient energy available in nature to power small electronic devices. Examples of non-conventional power sources include solar energy, vibration energy, radio frequency (RF) energy, heat energy, etc. Some of these energy sources are ubiquitous, while others are available only at particular times or locations.

The increasing use of wireless communication and wireless networks makes RF energy everywhere in the world. Most of the energy generated to facilitate RF communication is dissipated in the environment (e.g. air molecules, structures, organisms, etc.) Efforts are underway to capture some of this otherwise-lost RF energy to generate power.

BRIEF DESCRIPTION OF THE INVENTION

Embodiments of the invention include a device for harvesting radio frequency (RF) energy to generate power. The device includes a first spiral antenna having a first spiral direction, the first spiral antenna having a spiral cross-section shape along a first flat plane. The device includes a second spiral antenna having a second spiral direction opposite the first spiral direction, the second spiral antenna having a spiral cross-section shape along a second plane parallel to the first plane. The device further includes a ground layer between the first and second spiral antennae, the first spiral antenna electrically connected to the second spiral antenna at a center of the first and second spiral antennae by a conductive element passing through the ground layer without contacting the ground layer.

Additional embodiments include a device for harvesting radio frequency (RF) energy to generate power. The device includes a first array of spiral antennae arranged along a first flat plane and a second array of spiral antennae arranged along a second plane parallel to the first plane. The device also includes a ground layer arranged between the first array and the second array and a harvester circuit configured to receive an RF signal based on RF energy gathered by the first and second arrays of spiral antennae and to generate direct current (DC) power based on the RF signal.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Radio frequency (RF) energy is generated to communicate between RF devices, but the majority of RF energy is dissipated in the environment. Embodiments of the invention relate to harvesting RF energy with spiral antenna arrays.

Figure 1:
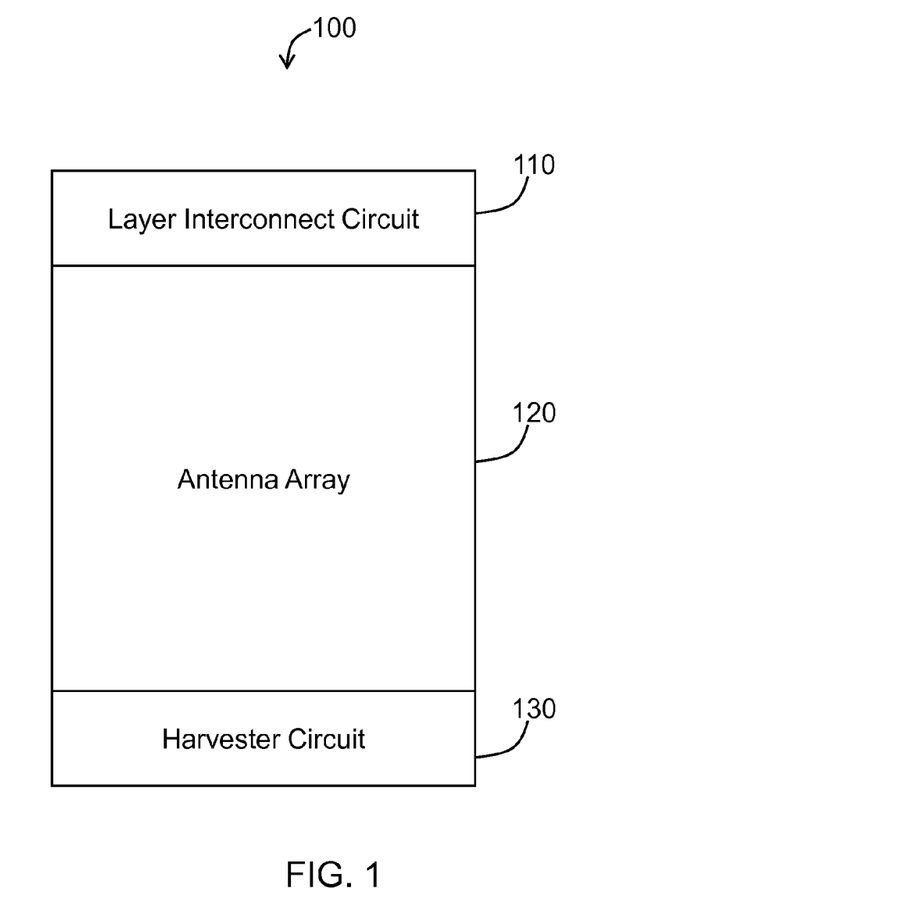
FIG. 1 illustrates an antenna assembly according to an embodiment of the invention.

FIG. 1 illustrates an antenna assembly 100 according to an embodiment of the invention. The antenna assembly 100 includes a layer interconnect circuit 110, an antenna array 120 and a harvester circuit 130. The antenna array 120 is a multi-layer antenna array, and the layer interconnect circuit 110 connects the multiple layers of the antenna array 120. The harvester circuit 130 collects the electrical energy generated by the antenna array 120 and proves an electrical outlet to provide the electrical energy to an electrical device, such as a battery or other device that runs on electricity or stores an electrical charge.

Figure 2:
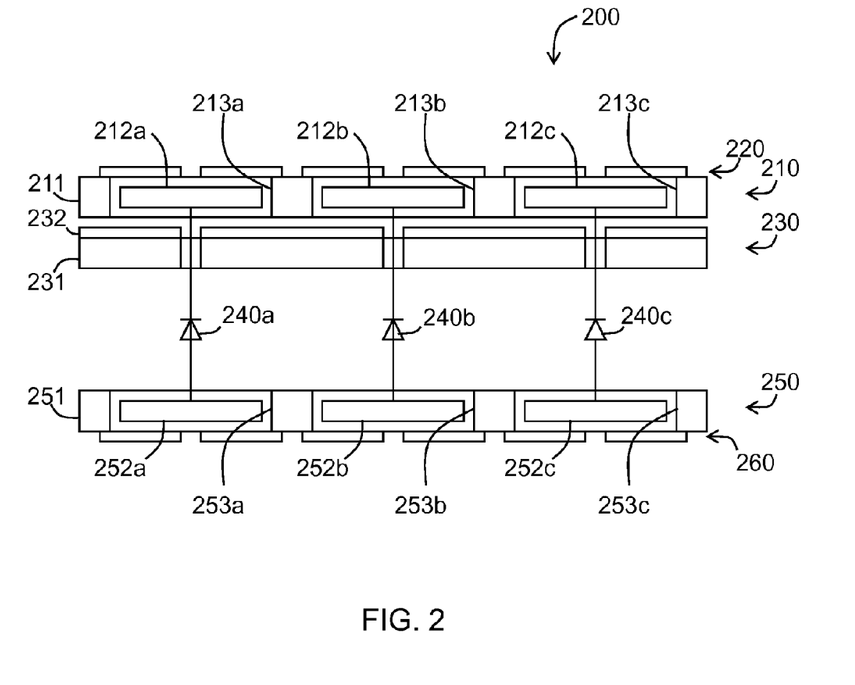
FIG. 2 illustrates a side view of a part of an antenna assembly according to an embodiment of the invention.

FIG. 2 illustrates a side view of an antenna assembly 200 according to an embodiment of the invention. The antenna assembly 200 includes a first spiral antenna layer 210, a first flat antenna layer 220, a ground layer 230, a second spiral antenna layer 250, and a second flat antenna layer 260. The first spiral antenna layer 210 includes three spiral antennae 212a, 212b and 212c located in openings 213a, 213b and 213c in a first substrate 211. The second spiral antenna layer 250 includes three spiral antennae 252a, 252b and 252c located in openings 253a, 253b and 253c in a second substrate 251. The three spiral antennae 212a, 212b and 212c are connected to the three spiral antennae 252a, 252b and 252c by electrical components including Schottky diodes 240a, 240b and 240c.

The first flat plate antenna layer 220 is formed on the first substrate 211. The first flat plate antenna layer 220 comprises a conductive material, and a separate flat plate antenna of the flat plate antenna layer 220 may be positioned above each spiral antenna 212a, 212b and 212c. Similarly, the second flat plate antenna layer 260 is formed on the second substrate 251. The flat plate antenna layers 220 and 260 will be described in further detail below with respect to FIG. 4.

The ground layer 230 includes a substrate 231 and ground plate 232. The ground plate 232 may be a conductive plate having holes cut into the plate to pass conductive lines connecting the first spiral antennae 212a, 212b and 212c and the second conductive antennae 252a, 252b and 252c. Since the first and second spiral antenna layers 210 and 250 are separated by a ground plate 232, the radiation fields of the spiral antennae of the respective layers 210 and 250 are at least partially separated, and polarization loss and electromagnetic interaction loss are reduced or eliminated.

Figure 3:
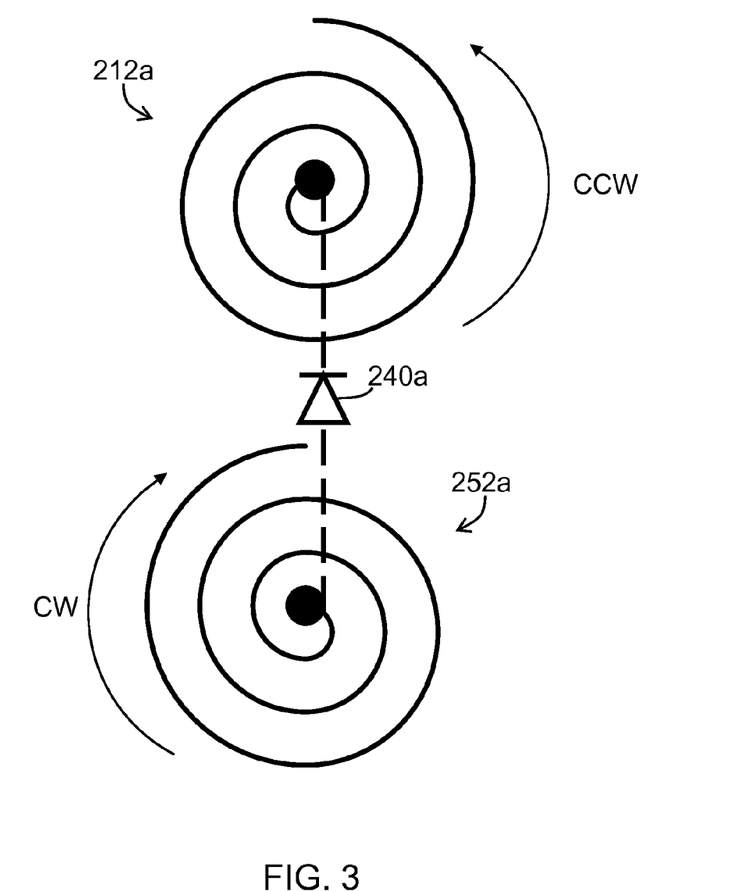
FIG. 3 illustrates interconnected spiral antennae according to an embodiment of the invention.

FIG. 3 illustrates connected spiral antennae 212a and 252a according to an embodiment of the invention. The spiral antennae 212a and 252a are arranged parallel to each other, and spiral in opposite directions. As illustrated in FIG.

3, the first spiral antenna 212a spirals in a counter-clockwise direction (CCW) and the second spiral antenna 252a spirals in a clockwise direction (CW) from its center outward. In embodiments of the invention, the spiral antennae 212a and 252a connected by the Schottky diode 240a form a rectanna, which is an antenna that detects or receives microwaves and generates a direct current (DC) output based on the detected or received microwaves. The Schottky diode 240a rectifies the signals generated by the spiral antennae 212a and 252a and a load (not shown) may be connected across the Schottky diode 240a.

In embodiments of the invention, the spirals of the spiral antennae 212a and 252a may be Archimedean-style, single-armed spirals. Technical effects of such spiral antennae include higher spectral efficiency than other planner antennae, and the spiral antennae are frequency independent. In addition, in some embodiments the bandwidths of the spiral antennae reach up to 40:1 for both the input impedance and radiation patterns.

In addition, as illustrated in FIGS. 2 and 3, the connected spiral antennae, such as spiral antennae 212a and 252a, result in dual polarization, which is achieved via dual planes of Archimedean spiral antennae, such as antennae 212a and 252a. In addition, as illustrated in FIG. 2, the ground plate 232 or 272 between the connected spiral antennae electromagnetic interaction due to parallelism of spirals having opposite polarities. Further, while FIG. 2 illustrates different antennae, plates and layers of varying thicknesses, the illustrated thicknesses and sizes are for purposes of illustration only, and embodiments of the invention are not limited to sizes or proportions illustrated in FIG. 2.

Figure 4:
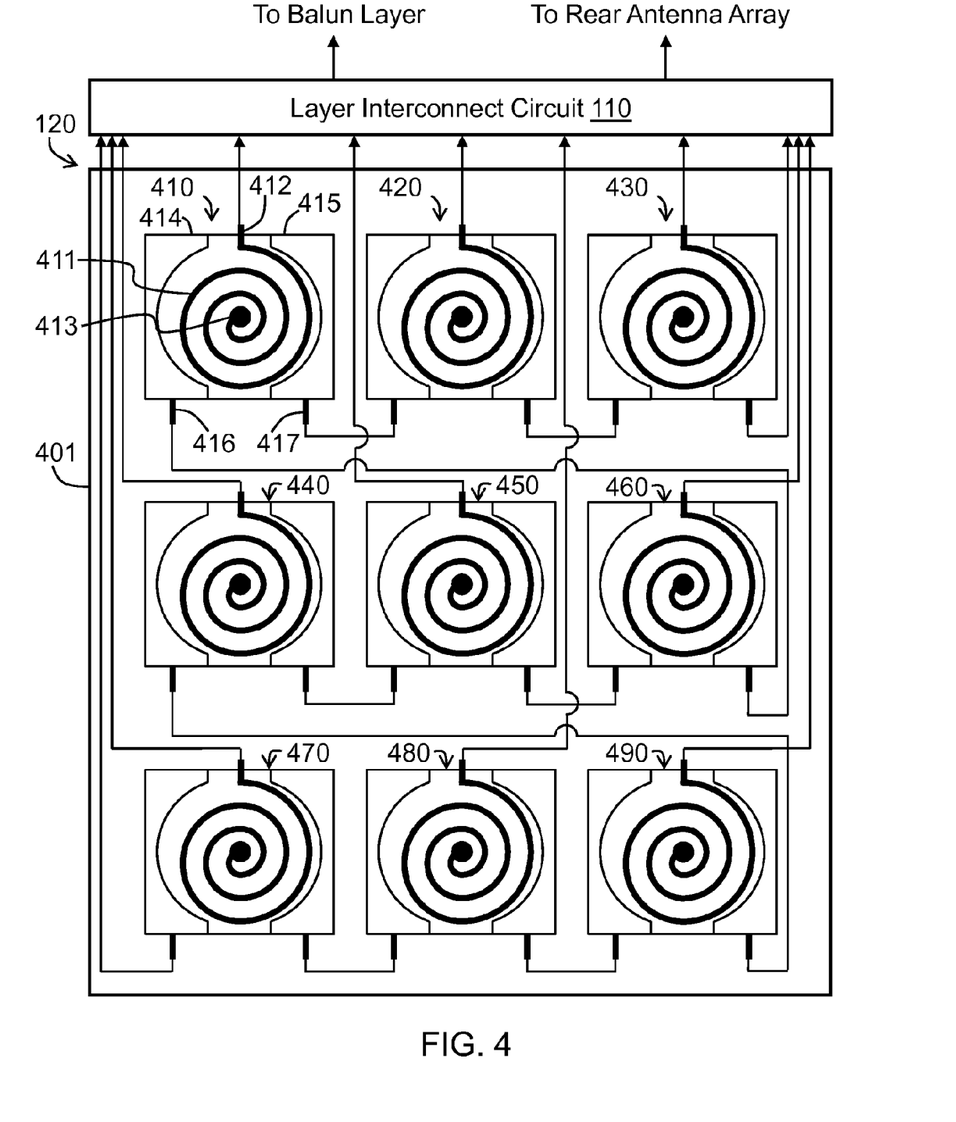
FIG. 4 illustrates an antenna array according to an embodiment of the invention.

FIG. 4 illustrates an antenna array 120 according to an embodiment of the invention. The antenna array 120 includes antenna modules 410, 420, 430, 440, 450, 460, 470, 480 and 490. The antenna module 410 will be described in further detail, although the characteristics of the antenna module 410 are the same as the characteristics of the antenna modules 420, 430, 440, 450, 460, 470, 480 and 490. In addition, the antenna modules 410, 420 and 430 may correspond to the spiral antennae 212a, 212b and 212c of FIG. 2.

The antenna module 410 includes a spiral antenna 411 and flat plate antennae 414 and 415. The flat plate antennae 414 and 415 make up a portion of the flat plate antenna layer 220 of FIG. 2. The flat plate antenna 415 includes an output connected to an adjacent flat plate antenna of the antenna module 420, and the flat plate antenna 414 includes an output connected to a different flat plate antenna of the antenna module 460. The spiral antenna 411 includes a first end connector 412 connected to a layer interconnect circuit 110 and a center connector 413 connected to a spiral antenna located on an opposite side of a spiral antenna assembly from the spiral antenna 411, as illustrated in FIG. 2.

The flat plate antennae 414 and 415, also referred to as patch antennae 414 and 415, capture leaky microwaves, or microwaves that may be emitted by the spiral antenna 411. The flat plate antennae 414 and 415 have angular shapes that substantially surround the spiral antenna 411 along a circumference of the spiral antenna 411, or in a radial direction with respect to the center of the spiral antenna 411. FIG. 2 illustrates the flat plate antenna layer 220 located on top of the substrate 211 for purposes of description. However, embodiments encompass flat plate antennae that are inserted into grooves in a substrate 211 to have an outer surface that is substantially flush with the outer surface of the substrate 211. The flat plate antennae 414 and 415 capture leaky waves and improve spiral antenna 411 broadband characteristics by improving a frequency vs. impedance curve of the spiral antenna 411.

The outputs from the antenna modules 410 to 490, including the spiral antennae 411 and the patch antennae 414 and 415 of each antenna module 410 to 490, are output to the layer interconnect circuit 110, which is a printed circuit in electrical communication with the array 120. In one embodiment, the layer interconnect circuit 110 is printed on the same substrate in which the antennae modules 410 to 490 are located. The substrate 401 may be, for example, a printed wiring board.

Figure 5:
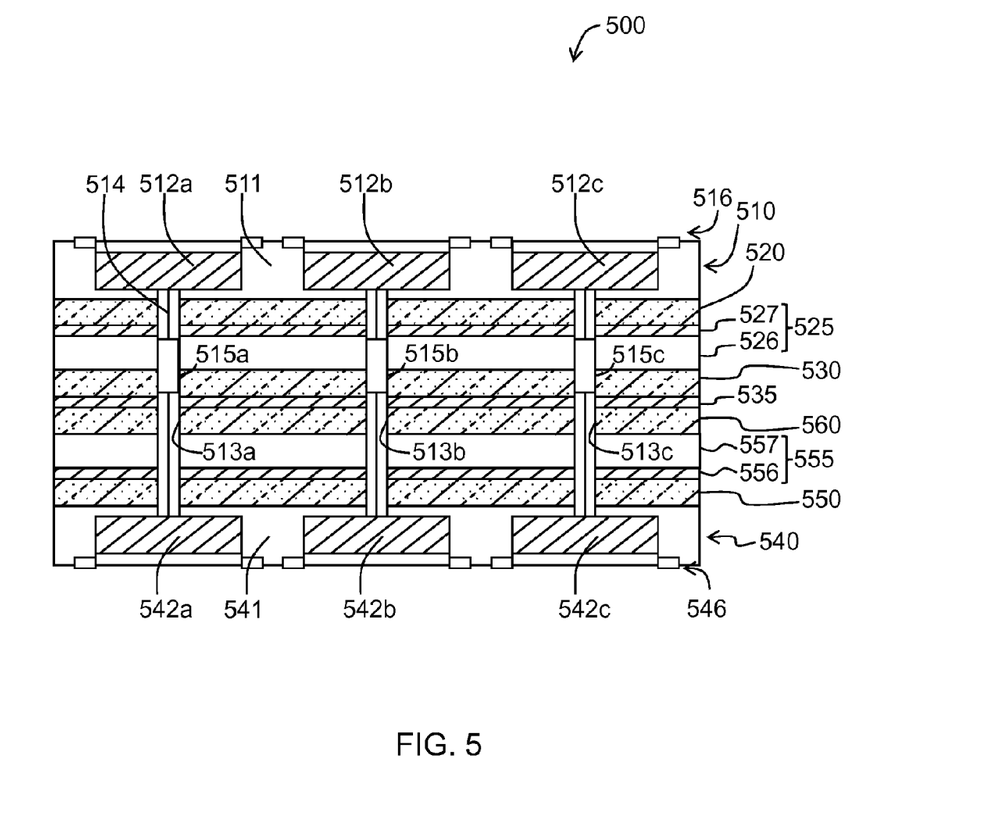
FIG. 5 illustrates layers of an antenna assembly according to an embodiment of the invention.

FIG. 5 illustrates a cross-section view of layers of an antenna assembly 500 according to an embodiment of the invention. The antenna assembly includes a first spiral antenna layer 510 including a substrate 511, spiral antennae 512a, 512b and 512c and patch antennae 516. The substrate 511 may be made of any electrically insulating material, such as a printed circuit board (PCB), resin, semiconductor material, or any other electrically insulating material. The antennae 512a, 512b and 512c and the patch antennae 516 may be made of any conductive material, such as copper, aluminum, gold, silver, or any other conductive material or alloy. The antenna 512a, 512b and 512c and the patch antennae 516 may be pre-formed and deposited on the substrate 511, may be formed by photolithography or chemical deposition on the substrate 511, or may be formed or deposited by any other process.

Below the first spiral antenna layer 510 is a first thin dielectric layer 520. Below the first thin dielectric layer 520 is a first balun layer 525. The first balun layer 525 includes balun wiring 527 on a substrate 526. Below the first balun layer 525 is a second thin dielectric layer 530. Below the thin dielectric layer 530 is a ground layer 535, including a conductive ground plate or wiring.

The antenna assembly 500 further includes a second spiral antenna layer 540 including a substrate 541, spiral antennae 542a, 542b and 542c and patch antennae 546. Above the second spiral antenna layer 540 is a third thin dielectric layer 550. Above the third thin dielectric layer 550 is a second balun layer 555. The second balun layer 555 includes balun wiring 557 on a substrate 556. Above the second balun layer 555 is a fourth thin dielectric layer 530. Above the fourth thin dielectric layer 560 is the ground layer 535.

As illustrated in FIG. 5, all of the layers 510, 520, 525, 530, 535, 540, 550, 555, and 560 have holes in them to form channels 513a, 513b and 513c extending between the spiral antennae 512a to 512c and the spiral antennae 542a to 542c. A rectifier 515a, 515b or 515c is located along wires 514a, 514b and 514c extending between the spiral antennae 512a to 512c and the spiral antennae 542a to 542c. In one embodiment, the rectifiers 515a to 515c are Schottky diodes. Although the rectifiers 515a to 515c are illustrated as being within the channels 513a to 513c, embodiments of the invention encompass any configuration in which the rectifiers 515a to 515c are located electrically between the spiral antennae 512a to 512c and the spiral antennae 542a to 542c. For example, the rectifiers 515a to 515c may be circuit elements mounted onto, or within, one of the dielectric layers 520, 530, 550, or 560, or mounted on the substrates 526 or 557. In addition, while FIG. 5 illustrates a wire or line 514 extending through the channel 513a, embodiments of the invention encompass any method of electrical connection, such as providing a conductive filling material to fill the channels 513a to 513c.

While the connections between the spiral antennae 512a to 512c and the spiral antennae 542a to 542c are illustrated in FIG. 5, it is understood that the antenna assembly 500 includes additional electrical and physical connections between various layers, including between the spiral antennae 512a to 512c and the first balun circuit 527, or balun wiring layer, and between the first balun circuit 527 and the first ground plate 537.

While the terms "above" and "below" have been used to describe the layers in view of FIG. 5, it is understood that embodiments of the invention encompass devices having layers arranged as in FIG. 5, but having any orientations, such as at an angle greater than zero with respect to FIG. 5. In addition, embodiments of the invention encompass antenna assemblies having additional layers or layers omitted, relative to FIG. 5. In one embodiment, the total thickness of the antenna assembly, such as the assembly 500 of FIG. 5, satisfies the following: $0.006\lambda o < h <= 0.05\lambda o$, where $\lambda o$ is the wavelength of a radio frequency (RF) wave in free space.

Figure 6:
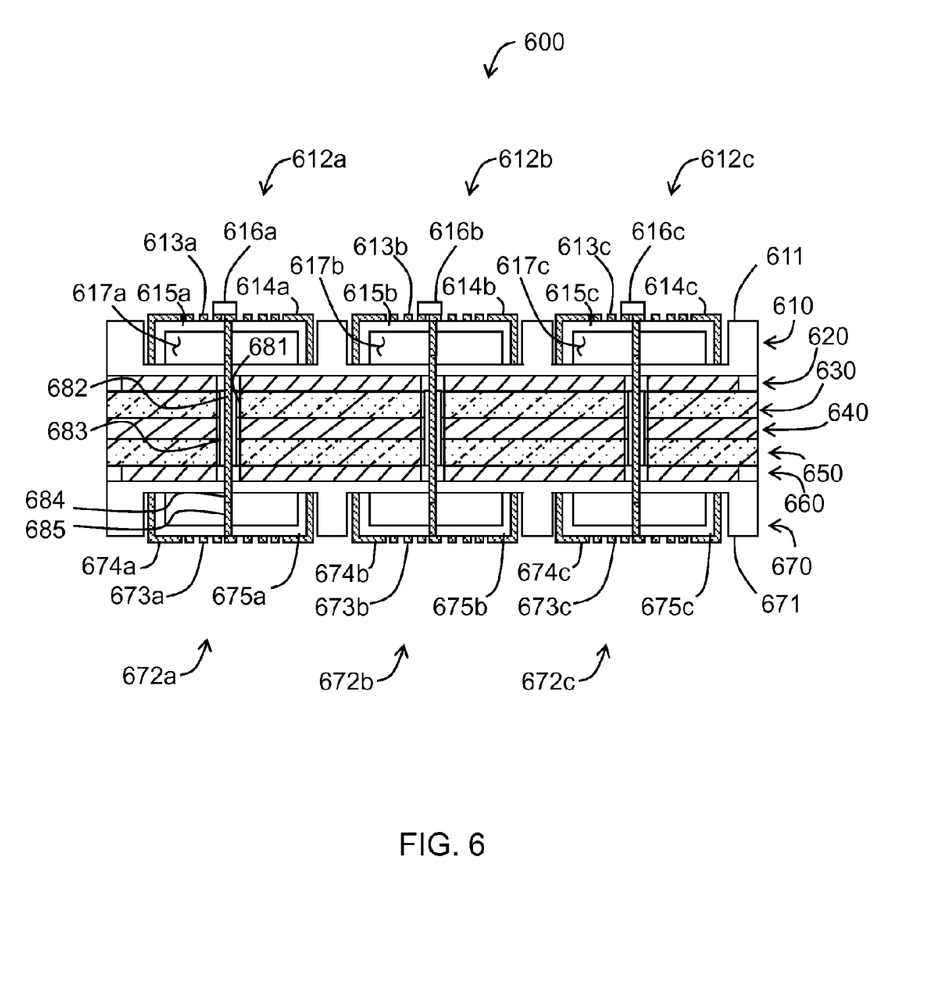
FIG. 6 illustrates layers of an antenna assembly according to another embodiment of the invention.

FIG. 6 illustrates a cross-section view of layers of an antenna assembly 600 according to an embodiment of the invention. The antenna assembly includes a first spiral antenna layer 610 including a substrate 611 and spiral antennae modules 612a, 612b and 612c. The substrate 611 may be made of any electrically insulating material, such as a printed circuit board (PCB), resin, semiconductor material, or any other electrically insulating material. The antenna modules 612a, 612b and 612c each include a dielectric insulating layer 615a, 615b or 615c which, together with the substrate 611, forms a cavity 617a, 617b or 617c. A spiral antenna 613a, 613b or 613c is formed on the dielectric insulating layer 615a, 615b or 615c. Patch antennae 614a, 614b or 614c are formed to surround the spiral antenna 613a, 613b or 613c on the surface of the dielectric insulating layer 615a, 615b or 615c. The patch antennae 614a, 614b and 614c are also configured to surround lateral sides of the dielectric insulating layers 615a, 615b or 615c. In other words, a portion of the patch antennae 614a, 614b or 614c is located on the same surface of the dielectric insulating layers 615a, 615b or 615c as the spiral antennae 613a, 613b or 613c, and a portion of the patch antennae 614a, 614b or 614c is located on lateral sides of the dielectric insulating layers 615a, 615b or 615c.

Below the first spiral antenna layer 610 is a first thin dielectric layer 620. Below the first thin dielectric layer 620 is a first balun layer 630. Below the first balun layer 620 is a second thin dielectric layer 630. Below the second thin dielectric layer 630 is a ground layer 640, which may be a conductive plate. The antenna assembly 600 further includes a second spiral antenna layer 670 including a substrate 671 and spiral antennae modules 672a, 672b and 672c. The substrate 671 may be made of any electrically insulating material, such as a printed circuit board (PCB), resin, semiconductor material, or any other electrically insulating material. The antennae modules 672a, 672b and 672c each include a dielectric insulating layer 675a, 675b or 675c. A spiral antenna 673a, 673b or 673c is formed on the dielectric insulating layer 675a, 675b or 675c. Patch antennae 674a, 674b or 674c are formed to surround the spiral antenna 673a, 673b or 673c on the surface of the dielectric insulating layer 675a, 675b or 675c. The patch antennae 674a, 674b and 674c are also configured to surround lateral sides of the dielectric insulating layers 675a, 675b or 675c.

As illustrated in FIG. 6, all of the layers 610, 620, 630, 640, 650, 660 and 670 have holes in them to form channels 681. For purposes of clarity, only the channel 681 extending between the spiral antennae 613a and 673a is labeled in FIG. 6, but each opposing pair of antennae 613a and 673a, 613b and 673b, and 613c and 673c is connected by a conductive line 682 extending through channels 681 in the layers 610, 620, 630, 640, 650, 660 and 670. In one embodiment, an insulator 683 surrounds the conductive line 682 within the channel 681 at locations corresponding to the ground layer 640 and balun layers 620 and 650 to prevent electrical contact between the conductive line 682 and the layers 640, 620 and 650.

In one embodiment, a rectifier 616a, 616b or 616c, such as a Schottky diode, is electrically connected to a center of the spiral antennae 613a, 613b or 613c. For example, the Schottky diode may be surface mounted to the center of the spiral antennae 613a, 613b or 613c. The rectifier 616a, 616b or 616c is located along the electrical path between the spiral arms of the spiral antennae 613a to 613c and the spiral antennae 673a to 673c.

In one embodiment, the spiral antenna modules 612a to 612c and 672a to 672c are readily connectable and disconnectable from the conductive line 682. As illustrated in FIG. 6, the conductive line 682 has a connector 684 that is located to connect to a connector 685 of each spiral antenna module 612a to 612c and 672a to 672c. The connectors 684 and 685 may be of any connection type, such as a male-female connector in which one connector is inserted into another. In alternative embodiments, the spiral antenna modules 612a to 612c and 672a to 672c may be connected to the substrates 711 and 771 or the conductive line 682 by adhesives, soldering or any other permanent connection process.

While the various layers and other features have been illustrated in FIG. 6 with different thicknesses, it is understood that the thicknesses and lengths of materials and features of FIG. 6 are provided by way of illustration only, and embodiments of the invention are not limited to the specific widths, lengths, thicknesses or relative dimensions illustrated in FIG. 6.

Figure 7:
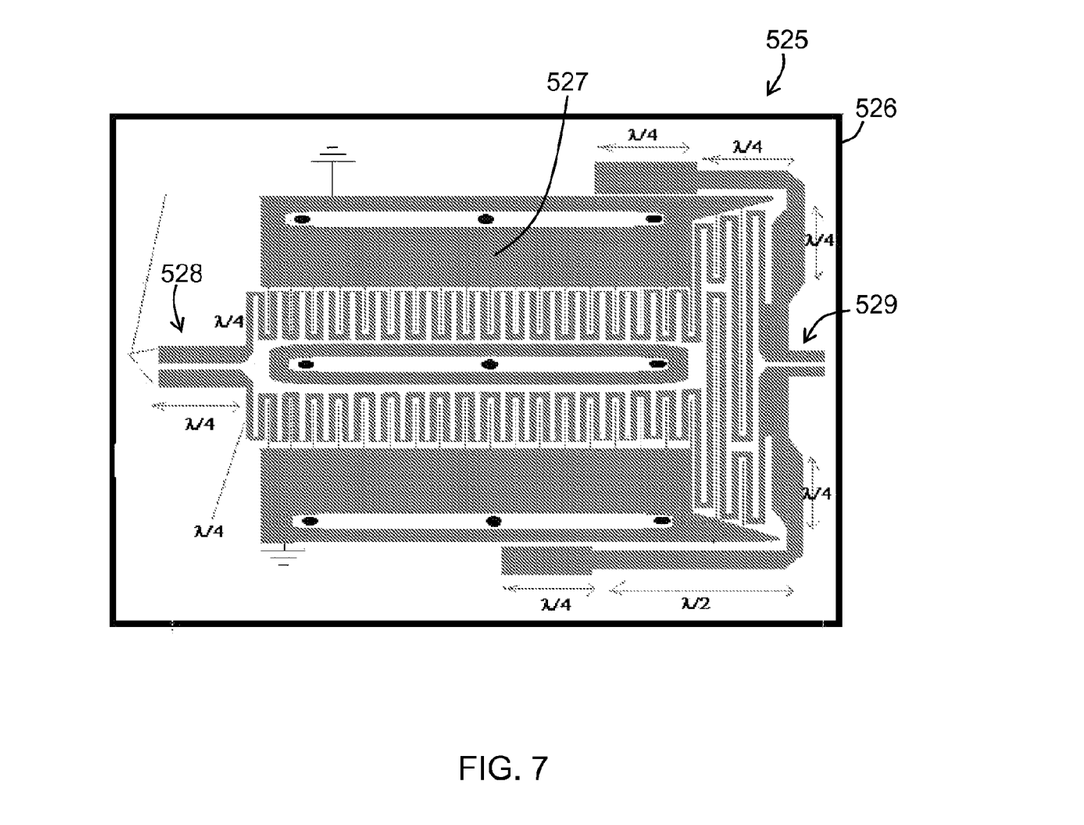
FIG. 7 illustrates a first balun layer according to an embodiment of the invention.

FIG. 7 illustrates a first balun layer 525 according to an embodiment of the invention. The balun layer illustrated in FIG. 7 may also correspond to the first balun layer 620 illustrated in FIG. 6. The first balun layer 525 includes the substrate 526 and the balun wiring 527. The balun wiring 527 may be any conductive material, such as copper, aluminum, etc. The balun wiring 527 may be printed on the substrate 526 via photolithography, etching, deposition, or any other method. The balun wiring 527 includes an input 528 from the first spiral antenna layer 510, and in particular from the spiral antennae 512a, 512b and 512c. The balun wiring 527 also includes outputs 529 to a harvester circuit (not shown in FIG. 7). The balun wiring 556 is also connected to ground, such as the ground plate 537. The balun wiring 527 is configured to match the impedance of the spiral antennae 512a to 512c with the harvester circuit.

Figure 8:
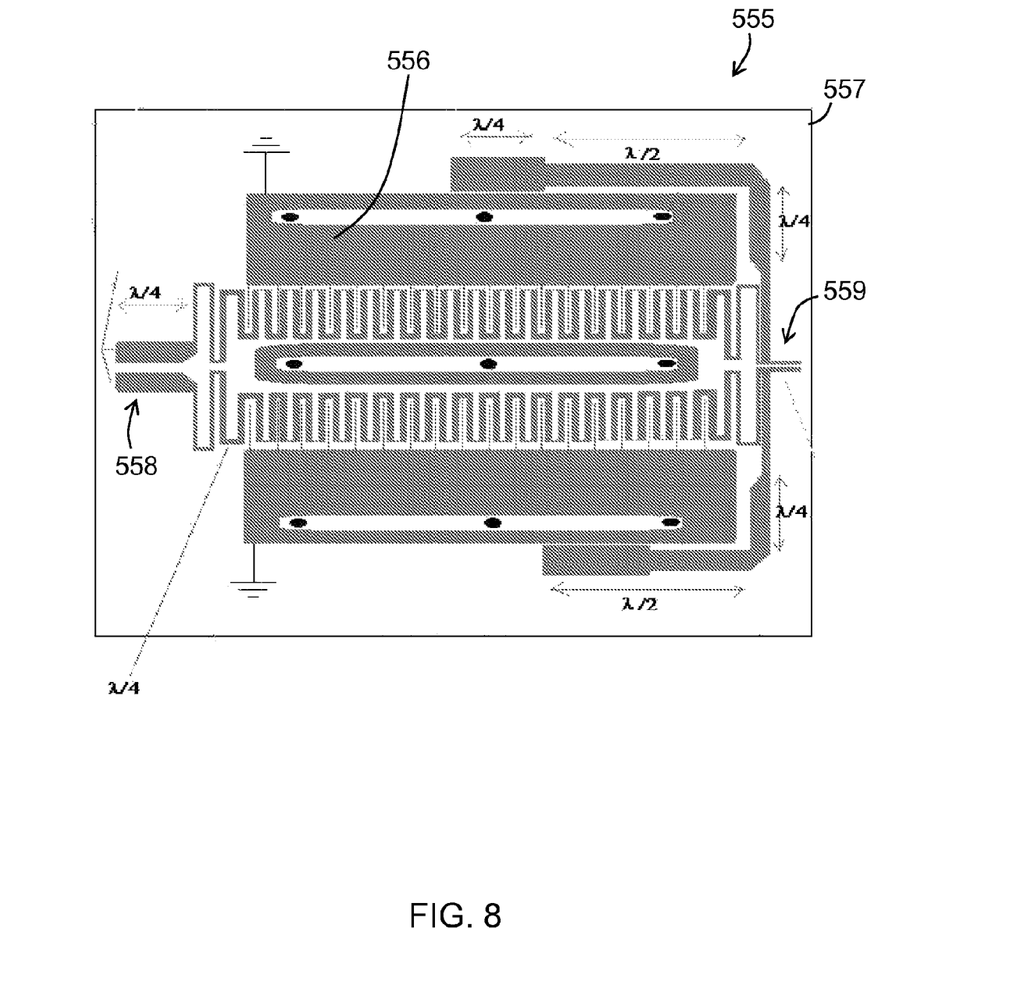
FIG. 8 illustrates a second balun layer according to an embodiment of the invention.

FIG. 8 illustrates a second balun layer 555 according to embodiments of the invention. The balun layer illustrated in FIG. 8 may also correspond to the second balun layer 660 of FIG. 6. The second balun layer 555 includes a substrate 557 and balun wiring 556. The balun wiring 556 includes an input 558 from the second spiral antenna layer 540, and in particular from the spiral antennae 542a, 542b and 542c. The balun wiring 556 also includes outputs 559 to a harvester circuit (not shown in FIG. 8). The balun wiring 556 is also connected to ground, such as the ground plate 566. The balun wiring 556 is configured to match the impedance of the spiral antennae 542a to 542c with the harvester circuit.

In embodiments of the invention, the balun wirings 527 and 556 comprise an "unbalanced" port converted into two "balanced" ports. The unbalanced port can either be the input or the output as the device's balanced ports conversely can be either the output or the input. The balun wirings 527 and 556 are designed to have a precise 180-degree phase shift, with minimum loss and equal balanced impedances. The balun wirings 527 and 556 provide technical benefits of improving isolation between the antenna arrays of the antenna layers 510 and 540, improving the impedance match between the antenna arrays and a harvesting circuit, improving balance/unbalance transformation characteristics, and decreasing noise interaction between the ports of the balun wirings 527 and 556. The baluns 527 and 556 are configured to transfer the input power from an unbalanced line (i.e. from the spiral antennae 512a to 512c and 542a to 542c) to a balanced transmission line at the output. The balun wirings 527 and 556 comprise a quarter-wavelength transformer, two branches or delay lines and output lines.

The balun wirings 527 and 556 use electro-magnetic coupling to provide an equal level of power at both the output ports but with a phase difference of 180 degrees over a wide frequency range. The balun wirings 527 and 556 include $\lambda/4$ and $\lambda/2$ elements (where $\lambda$ is the center frequency wavelength) with alternate interdigital capacitor-like structures formed by micro strip line projections from ground (such as the ground plates 537 and 566) coupling with alternate loops of microstrip lines. For improved bandwidths multiple sections of half wavelength lines are interconnected by quarter wavelengths. The equivalent electrical model would be series inductors with parallel capacitors whose one end is connected ground. As a whole they form coupled line couplers. The coupled line couplers include of two quarter wavelength lines with capacitive coupling between them. The coupling between the two lines is the result of interaction of electromagnetic fields of each line. Using the planar parallel and series inductor and capacitor circuits to realize the effective open and short circuits respectively.

As illustrated in FIGS. 7 and 8, the input lines 528 and 558 of the balun wirings 527 and 556 form two sets of loop elements. One set of loop elements has a constant $\lambda/4$ length, resulting in a balanced structure. The other set of loop elements has 180 degree out-of-phase structure, resulting in an unbalanced output along with pi-structure formation with unbalanced $\lambda/4$ and $\lambda/2$ elements. The resulting balun wirings 527 and 556 each have four ports, two input ports and two output ports.

Referring to FIGS. 4, 5, 7 and 8 the layer interconnect circuit 110 of FIG. 4 connects the outputs from the spiral antennae modules 410 to 490, including the spiral antennae 411 and the patch antennae 414 and 415 to each other and to the balun layers 525 and 555. In one embodiment, the outputs 412 of all of the spiral antennae 411 of each planar array 120, are interconnected. For example, the array 120 illustrated in FIG. 4 is one array corresponding to the first spiral antenna layer 510 of FIG. 5 and the second spiral antenna layer 540 includes a similar array having spiral antenna with spirals of an opposite direction. In such an embodiment, all of the spiral antennae of the first spiral antenna layer 510 are connected to each other, and all of the spiral antennae of the second spiral antenna layer 540 are connected to each other. The outputs from the spiral antennae of the first spiral antenna layer 510 comprise one input 528 of the first balun wiring 525 and one input 558 of the second balun wiring 555. Similarly, the outputs from the spiral antennae of the second spiral antenna layer 540 comprise one input 528 of the first balun wiring 525 and one input 558 of the second balun wiring 555.

In one embodiment, the wiring of the interconnect circuit 110 connects the spiral antennae of the first spiral antenna layer 510 and the spiral antennae of the second spiral antenna layer 540 together in series, such that all of the spiral antennae of the antenna assembly 500 are connected in series, and ends of the spiral antennae are connected to the balun wirings 527 and 556. Similarly, in one embodiment, all of the patch antennae 516 and 546 are connected in series, and ends of the series of patch antennae are connected to the balun wiring layers 527 and 556.

Figure 9:
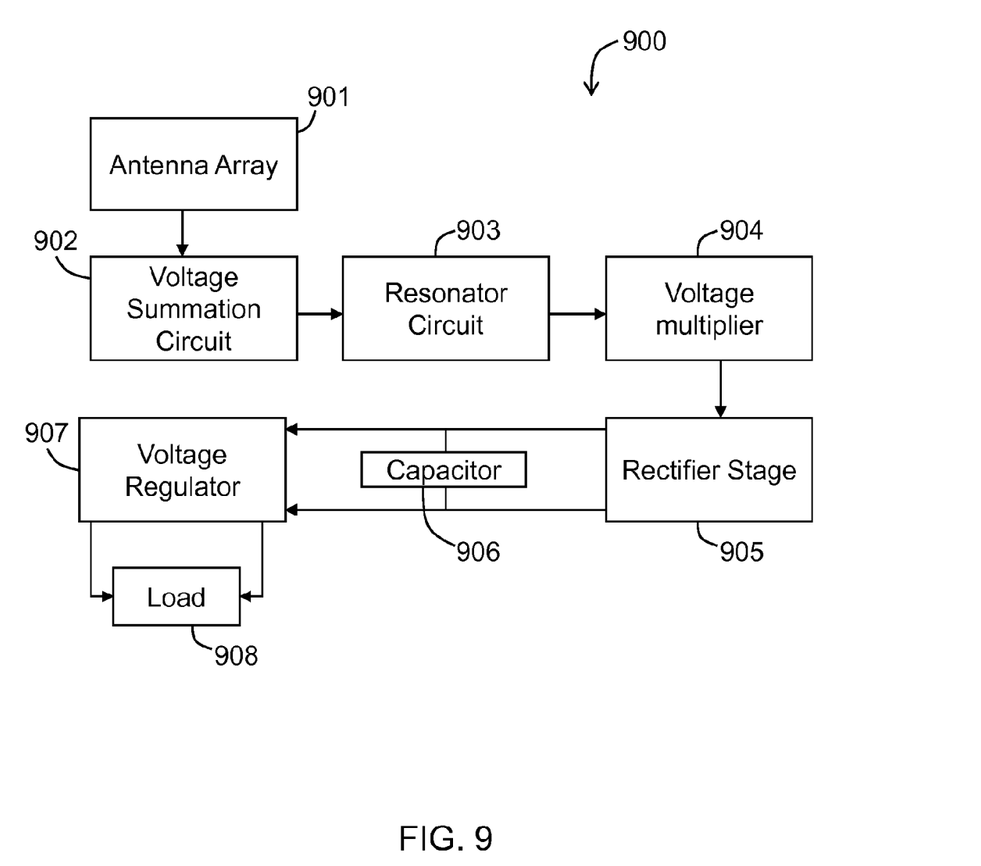
FIG. 9 illustrates a block diagram of harvester assembly according to an embodiment of the invention.

FIG. 9 illustrates a block diagram of a harvester assembly 900 according to an embodiment of the invention. The assembly 900 includes an antenna array 901 connected to a voltage summation circuit 902. The voltage summation circuit 902 may include an operational amplifier (op-amp). The antenna array 901 gathers energy from microwaves each antenna of the antenna array 901 transmits the gathered energy to the voltage summation circuit 902 to combine the gathered voltage into one power signal. The antenna array 901 may correspond to the antenna array 120 of FIGS. 1 and 4, for example. The gathered energy is harvested via a resonator circuit 903 and voltage multiplier 904, such as a two-stage Dickson Charge pump. The resonator circuit 903, also referred to as a resonator tank, ensures that sufficient voltage swing is supplied in the power signal from the voltage summation circuit 902 to drive the rectifier stage 905.

The resulting signal is input to a rectifier stage 905. In one embodiment, the rectifier stage 905 includes a three or four stage rectifier circuit. Since some power loss occurs in the rectifier circuit, due to the energy required to drive the diode junction barrier, a capacitor 906 may be provided between the rectifier 905 and a voltage regulator 907. The capacitor 906 may be selected such that the charging time of the capacitor is not more than one to three seconds, and the charge level is high. In one embodiment, multiple capacitors, or multiple super-capacitors, are connected in series. The rectifier 905 converts the RF power from the antenna array 901 to DC power. The voltage regulator 907 receives the rectified voltage from the rectifier stage 905 and outputs a regulated voltage at a predetermined level. The power from the voltage regulator 907 is output to a load, such as a battery.

In one embodiment, the harvester assembly 900 includes one or more microcontrollers configured to calculate a power input level and to auto-tune a matching circuit for available RF signals at a particular frequency.

Embodiments of the invention encompass rectanna antennae, and in particular, arrays of spiral antennae that are parallel to each other, that spiral in opposite directions and that are connected to each other. A ground plane is provided between the arrays of antennae to isolate the electric fields of the antennae. A dielectric layer is provided between the ground plane and the arrays of antennae to increase structural strength and to increase a gain vs. frequency of the assembly.

A rectifier, such as a Schottky diode, connects the centers of the spiral antennae of different arrays via a hole that extends through the antenna array assembly, including ground layers, dielectric layers and balun layers. In some embodiments, the Schottky diode itself is used for the matching and filtering of the output signal. However, in some embodiments of the invention, a transmission-line matching circuit is provided to match the optimal diode impedance for all frequencies, according to the maximum power transfer theorem.

The dimensions of the spiral antennae may be adjusted according to desired design characteristics. In one embodiment, the diameter of the rectenna elements (or spiral antennae) satisfies the following: $0.3333\ \lambda o<L<0.5\ \lambda o$), where L is the diameter of each rectenna element and $\lambda o$ is the free space wavelength of a radio frequency (RF) wave. To obtain a tilt beams, the outermost periphery of the rectenna array must be more than $2\lambda^g$. The tilted beam is obtained by superimposing a radiation field between a first active region, such as a spiral antenna having a circumference of $1\lambda^g$ and a second active region, such as a spiral antenna having a circumference of $2\lambda^g$. Here, $\lambda^g$=a wave length in a dielectric medium of an antenna assembly, such as the antenna assembly illustrated in FIG. 5. In embodiments of the invention, the dielectric constant, $\in r$, of the substrate in which the antennae are housed, such as the substrate 511 of FIG. 5, satisfies the following: $0.2<\in r<12$. In addition, the dielectric thickness, h, satisfies the following: $0.003\lambda o<h<0.05\lambda o$.

The number of turns of the spiral antennae depends on an antenna impedance calculation that matches with the optimal diode impedance. A spiral antenna having a larger number of turns with optimal spacing has more spectral efficiency and bandwidth. The circumference of the radiation zone determines the radiation frequency. In embodiments of the invention, the circumference of the radiation zone is greater than $2\times\lambda o$, where $\lambda o$ is the wavelength of the RF wave in free space.

There are two possible excitations for spiral antennae: out of phase excitation (balanced) and in-phase excitation. The out of phase excitation creates the so-called normal or the first spiral mode and the in-phase excitation creates the second mode. Since the normal mode has a single lobe broadside pattern, it requires a balanced input. This can be achieved by using a broadband balun, such as the balun layers 525 and 555 of FIG. 5.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A device for harvesting radio frequency (RF) energy to generate power, comprising:
   a first spiral antenna having a first spiral direction, the first spiral antenna having a spiral cross-section shape along a first flat plane;
   a second spiral antenna having a second spiral direction opposite the first spiral direction, the second spiral antenna having a spiral cross-section shape along a second plane parallel to the first plane; and
   a ground layer between the first and second spiral antennae, the first spiral antenna electrically connected to the second spiral antenna at a center of the first and second spiral antennae by a conductive element passing through the ground layer without contacting a ground plate of the ground layer;
   a first dielectric layer surrounding the first spiral antenna along the first flat plane; and
   a first flat antenna mounted to the first dielectric layer, the first flat antenna defining a fourth plane parallel to the first flat plane.

2. A device for harvesting radio frequency (RF) energy to generate power, comprising:
   a first spiral antenna having a first spiral direction, the first spiral antenna having a spiral cross-section shape along a first flat plane;
   a second spiral antenna having a second spiral direction opposite the first spiral direction, the second spiral antenna having a spiral cross-section shape along a second plane parallel to the first plane; and
   a ground layer between the first and second spiral antennae, the first spiral antenna electrically connected to the second spiral antenna at a center of the first and second spiral antennae by a conductive element passing through the ground layer without contacting a ground plate of the ground layer;
   wherein the conductive element includes a Schottky diode.

3. The device of claim 1, wherein the ground layer defines a third plane parallel to the first flat plane and the second plane.

4. The device of claim 1, wherein the first dielectric layer has a thickness greater than a thickness of the first spiral antenna, such that the fourth plane does not intersect the first flat plane.

5. The device of claim 1, further comprising:
   a first balun layer between the first spiral antenna and the ground layer, the first balun layer electrically connected to the first spiral antenna and the ground layer; and
   a second balun layer between the second spiral antenna and the ground layer, the second balun layer electrically connected to the second spiral antenna.

6. The device of claim 5, further comprising:
   a harvester circuit connected to the outputs of the first and second balun layers, the harvester circuit configured to receive a radio frequency (RF) signal gathered by the first and second spiral antennae and to generate a direct current (DC) signal based on the RF signal.

7. The device of claim 1, wherein the first spiral antenna includes a first array of multiple first spiral antennae arranged along the same first flat plane, and
   the second spiral antenna includes a second array of multiple second spiral antennae arranged along the same second plane.

8. The device of claim 7, wherein the multiple first spiral antennae and the multiple second spiral antennae are arranged in series electrically.

* * * * *